US009347636B2

(12) United States Patent
Soda et al.

(10) Patent No.: US 9,347,636 B2

(45) Date of Patent: May 24, 2016

(54) VEHICLE LIGHTING UNIT

(71) Applicant: Stanley Electric Co., Ltd., Tokyo (JP)

(72) Inventors: Toshiyasu Soda, Tokyo (JP); Hisashi Furuya, Tokyo (JP); Shinji Yamagata, Tokyo (JP); Toshihiro Oikawa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 117 days.

(21) Appl. No.: 14/222,746

(22) Filed: Mar. 24, 2014

(65) Prior Publication Data

US 2014/0286033 A1 Sep. 25, 2014

(30) Foreign Application Priority Data

Mar. 25, 2013 (JP) ................................ 2013-061725

(51) Int. Cl.
*B60Q 1/04* (2006.01)
*F21S 8/10* (2006.01)

(52) U.S. Cl.
CPC ......... *F21S 48/1747* (2013.01); *F21S 48/1109* (2013.01); *F21S 48/1159* (2013.01); *F21S 48/137* (2013.01); *F21S 48/1364* (2013.01); *F21S 48/1388* (2013.01); *F21S 48/14* (2013.01); *F21S 48/142* (2013.01); *F21S 48/328* (2013.01)

(58) Field of Classification Search
CPC .............. F21S 48/1705; F21S 48/1747; F21S 48/1752; F21S 48/14; F21S 48/142; F21S 48/1388; F21S 48/137; F21S 48/1159; F21S 48/1109
See application file for complete search history.

(56) References Cited

U.S. PATENT DOCUMENTS

| | | | | |
|---|---|---|---|---|
| 2005/0094413 A1 | 5/2005 | Sazuka et al. | | |
| 2011/0103081 A1* | 5/2011 | Thullier | F21S 48/1109 | 362/396 |
| 2011/0292669 A1* | 12/2011 | Albou | F21S 48/1159 | 362/517 |
| 2012/0201040 A1* | 8/2012 | Naganawa | F21S 48/1104 | 362/487 |
| 2015/0009700 A1* | 1/2015 | Yamamoto | F21S 48/1159 | 362/538 |

FOREIGN PATENT DOCUMENTS

JP 2005-141919 A 6/2005

* cited by examiner

*Primary Examiner* — Peggy Neils
(74) *Attorney, Agent, or Firm* — Kenealy Vaidya LLP

(57) ABSTRACT

A vehicle lighting unit forming low-beam and high-beam light distribution patterns can include: a light source having a substrate, and a first light-emitting section and a second light-emitting section arranged in two rows on a surface of the substrate; a first optical system configured to control light emitted from the first light-emitting section to form at least part of the low-beam light distribution pattern; a second optical system configured to control light emitted from the second light-emitting section to form at least part of the high-beam light distribution pattern; a light-shielding section disposed between the first light-emitting section and the second light-emitting section, the light-shielding section configured to shield part of the light from the first light-emitting section so as not to enter the second optical system; and a control unit configured to control to form the low-beam light distribution pattern or the high-beam light distribution pattern.

2 Claims, 11 Drawing Sheets

VEHICLE LIGHTING UNIT

This application claims the priority benefit under 35 U.S.C. §119 of Japanese Patent Application No. 2013-061725 filed on Mar. 25, 2013, which is hereby incorporated in its entirety by reference.

TECHNICAL FIELD

The presently disclosed subject matter relates to vehicle lighting units, and in particular, to a vehicle lighting unit for use in, for example, vehicle headlight, configured to form a low-beam light distribution pattern or a high-beam light distribution pattern.

BACKGROUND ART

Conventional vehicle headlights can include a lighting unit dedicated for forming a low-beam light distribution pattern (so-called as a low-beam lighting unit) and/or a lighting unit dedicated for forming a high-beam light distribution pattern (so-called as a high-beam lighting unit), such as those disclosed in Japanese Patent Application Laid-Open No. 2005-141919 (or corresponding U.S. Patent Application Laid-Open Publication No. 2005094413A1).

In such a vehicle headlight, the low-beam lighting unit can be lit to form a low-beam light distribution pattern while the high-beam lighting unit can be lit to form a high-beam light distribution pattern.

In the vehicle headlight described in Japanese Patent Application Laid-Open No. 2005-141919, the low-beam lighting unit and the high-beam lighting unit are constituted of two physically separated lighting units, and the light source is required for each lighting unit. As a result, costs and assembly steps for light sources can be increased.

SUMMARY

The presently disclosed subject matter was devised in view of these and other problems and features in association with the conventional art. According to an aspect of the presently disclosed subject matter, a vehicle lighting unit for use in, for example, a vehicle headlight, configured to switchably form a low-beam light distribution pattern and a high-beam light distribution pattern can reduce costs and assembly steps for light sources.

According to another aspect of the presently disclosed subject matter, a vehicle lighting unit configured to form a low-beam light distribution pattern and a high-beam light distribution pattern can include: a light source having a substrate with a principal surface, and a first light-emitting section and a second light-emitting section arranged in two rows on the principal surface of the substrate, each of the first and second light-emitting sections including at least one semiconductor light-emitting element; a first optical system configured to control light emitted from the first light-emitting section to form at least part of the low-beam light distribution pattern; a second optical system configured to control light emitted from the second light-emitting section to form at least part of the high-beam light distribution pattern; a light-shielding section disposed between the first light-emitting section and the second light-emitting section, the light-shielding section configured to shield part of the light from the first light-emitting section so as not to enter the second optical system; and a control unit configured to control the first light-emitting section and the second light-emitting section to switch the vehicle lighting unit to form the low-beam light distribution pattern or the high-beam light distribution pattern.

In the vehicle lighting unit with the above configuration, since the single vehicle lighting unit, for example, for use in a vehicle headlight, can be configured to form a low-beam light distribution pattern and a high-beam light distribution pattern, this can reduce costs and assembly steps for light sources. This is because two separate lighting sections are not used as light sources, but the single light source can include the first light-emitting section and the second light-emitting section arranged in two rows on the surface of the substrate.

When a light source including the first light-emitting section and the second light-emitting section arranged in two rows on the surface of the substrate is used for the vehicle lighting unit, glare light may be generated due to the light from the first light-emitting section entering the second optical system.

To cope with this, the vehicle lighting unit with the above configuration can include the light-shielding section disposed between the first light-emitting section and the second light-emitting section, and the light-shielding section can shield the light from the first light-emitting section so as not to enter the second optical system, thereby preventing glare light and the like from being generated.

Furthermore, since the single vehicle lighting unit can form the low-beam light distribution pattern and the high-beam light distribution pattern. Accordingly, when compared with the conventional vehicle lighting unit, a space where the vehicle lighting unit is to be installed can be reduced. This can facilitate the achievement of a smaller vehicle lighting unit for use in a vehicle headlight.

In the vehicle lighting unit with the above configuration, the first light-emitting section and the second light-emitting section can be directed substantially downward in the vertical direction. The first light-emitting section can be disposed on a rear side in the front-to-rear direction of a vehicle body and the second light-emitting section can be disposed on a front side in the front-to-rear direction of a vehicle body. The first optical system can include a lower reflection surface disposed below the light source so as to allow light emitted from the first light-emitting section downward and not shielded by the light-shielding section to be incident thereon. The lower reflection surface can be configured to reflect the light from the first light-emitting section to project the light forward so as to form part of the low-beam light distribution pattern. The second optical system can include: a sub-reflection surface that is disposed in front of the light source and at a position where the light that is emitted from the first light-emitting section and to be incident on the lower reflection surface is not shielded and can be configured to reflect light from the second light-emitting section upward; and an upper reflection surface disposed above the light source so as to allow the light reflected by the sub-reflection surface to be incident thereon. The upper reflection surface can be configured to reflect the light from the sub-reflection surface to project the light forward so as to form a condensation area of the high-beam light distribution pattern.

With this configuration, the above-discussed advantageous effects can be achieved.

The vehicle lighting unit with the above configuration can further include an attachment section to which the light source is attached, and a holder configured to hold the light source between the attachment section and itself and to which the light-shielding section is provided.

In the vehicle lighting unit with the above feature, only by allowing the light source to be held between the holder and the attachment section, the light-shielding section can be appropriately disposed between the first light-emitting section and the second light-emitting section.

In accordance with the presently disclosed subject matter, the vehicle lighting unit for use in, for example, a vehicle headlight, configured to switchably form a low-beam light distribution pattern and a high-beam light distribution pattern can reduce costs and assembly steps for light sources.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

Figure 1:
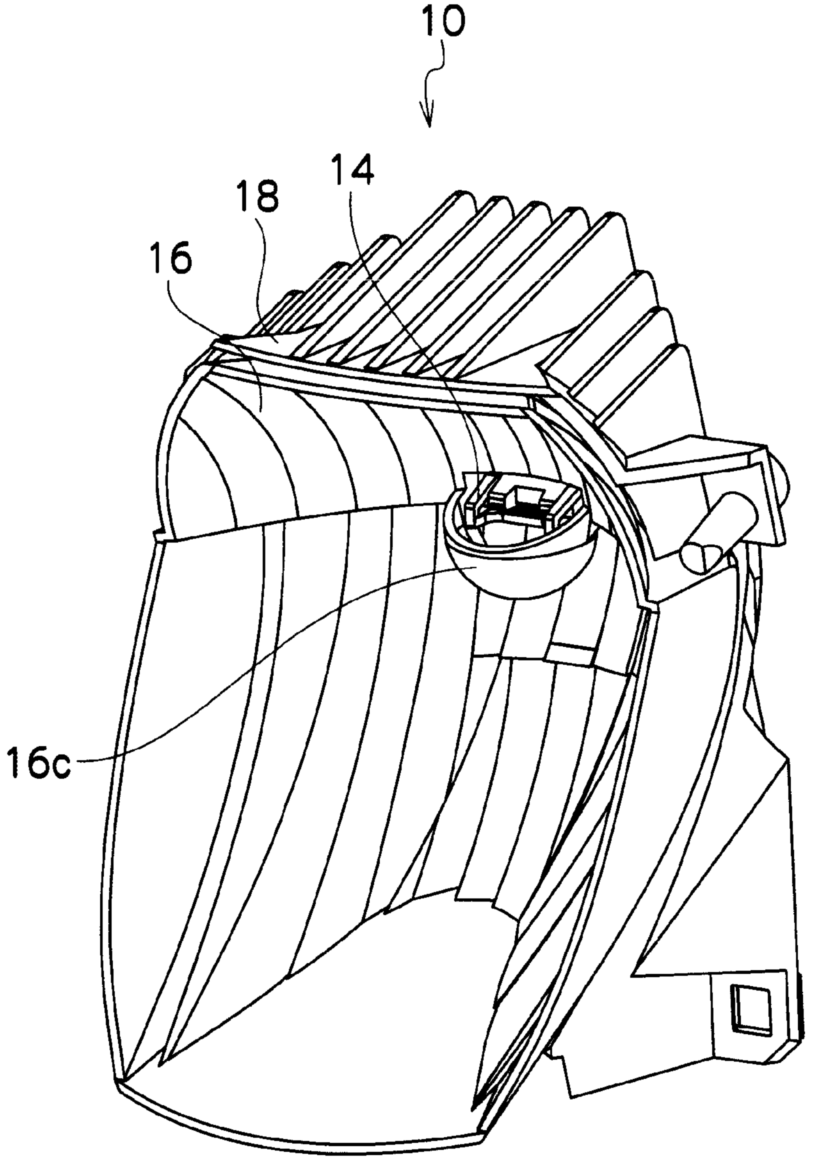
FIG. 1 a perspective view illustrating a vehicle lighting unit for use in a vehicle headlight to be disposed on right and left front areas of a vehicle body such as an automobile made in accordance with principles of the presently disclosed subject matter.
Figure 2:
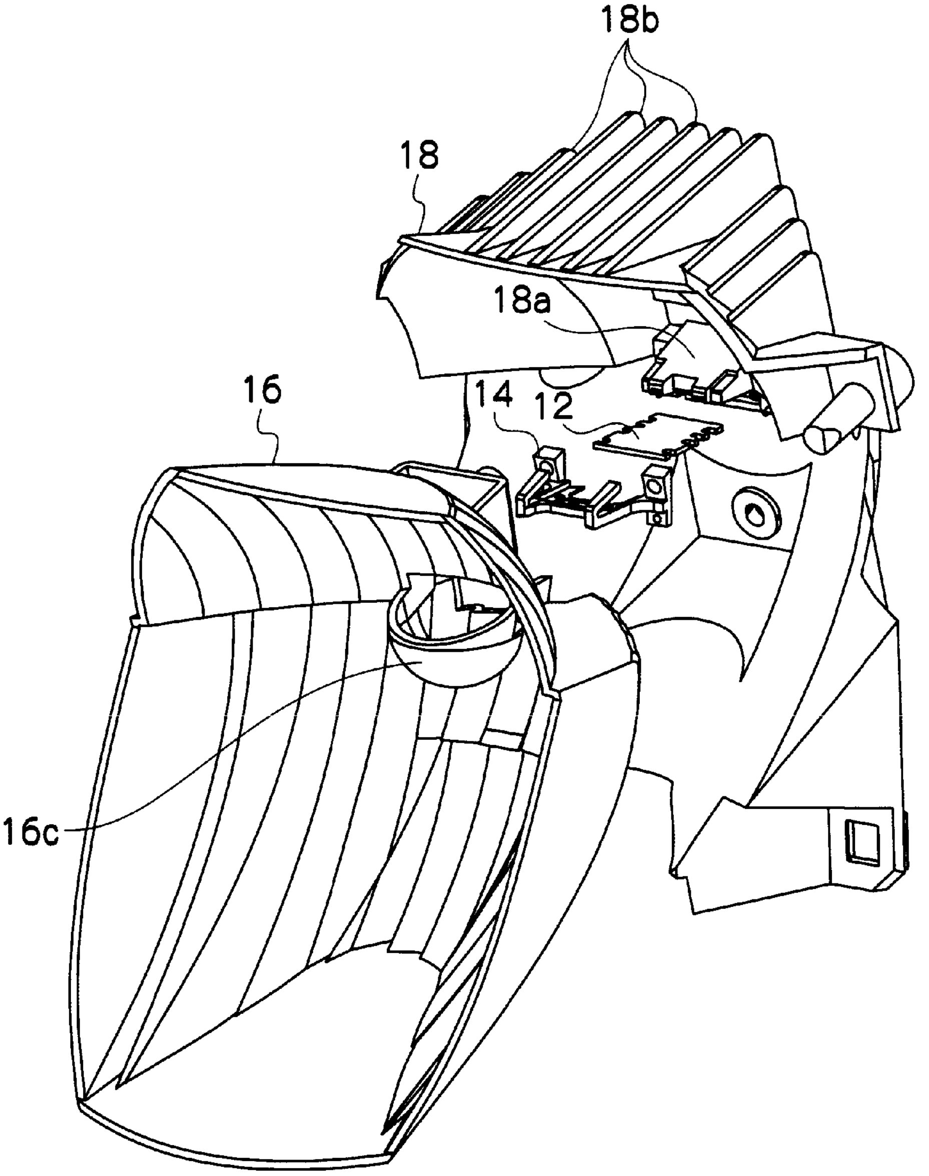
FIG. 2 is an exploded perspective view of the vehicle lighting unit for use in an vehicle headlight.

A description will now be made below to vehicle lighting units of the presently disclosed subject matter with reference to the accompanying drawings in accordance with exemplary embodiments. FIG. 1 a perspective view illustrating a vehicle lighting unit 10 for use in a vehicle headlight to be disposed on right and left front areas of a vehicle body such as an automobile made in accordance with principles of the presently disclosed subject matter. FIG. 2 is an exploded perspective view and FIG. 3 a vertical sectional view of the vehicle lighting unit 10. FIGS. 4A and 4B are a low-beam light distribution pattern $P_{Lo}$ and a high-beam light distribution pattern $P_{Hi}$ formed by the vehicle lighting unit 10 on a virtual vertical screen assumed to be disposed in front of the vehicle lighting unit (assumed to be disposed approximately 25 m ahead of the vehicle front), respectively.

The vehicle lighting unit 10 for use in a vehicle headlight made in accordance with the principles of the presently disclosed subject matter can be configured to form the low-beam light distribution pattern $P_{Lo}$ (see FIG. 4A) and a high-beam light distribution pattern $P_{Hi}$ (see FIG. 4B) on a virtual vertical screen assumed to be disposed in front of the vehicle lighting unit (assumed to be disposed approximately 25 m ahead of the vehicle front).

Figure 3:
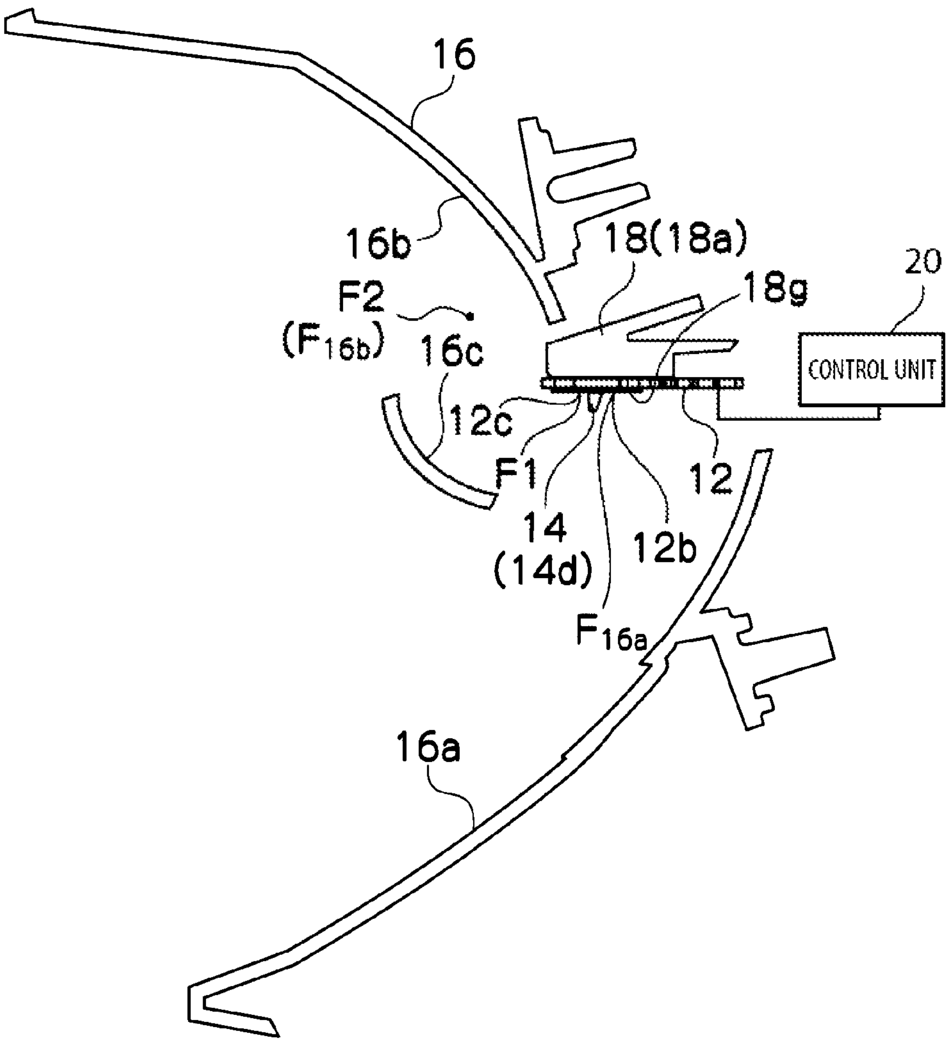
FIG. 3 a vertical sectional view of the vehicle lighting unit for use in an vehicle headlight.
Figure 4A:
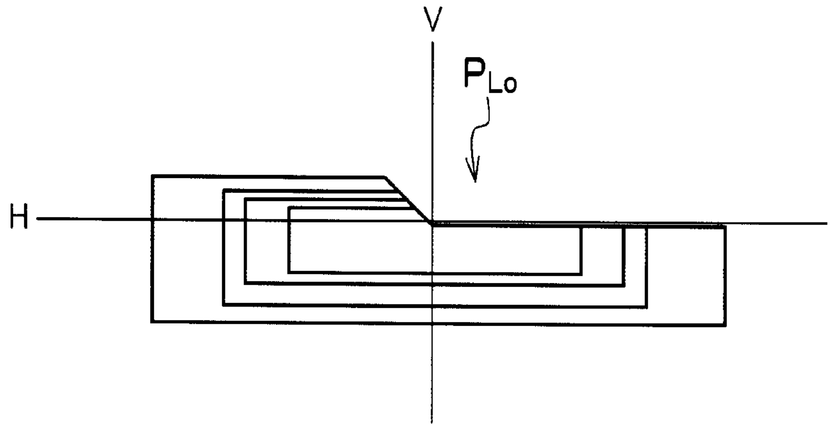
FIGS. 4A and 4B are a low-beam light distribution pattern $P_{Lo}$ and a high-beam light distribution pattern $P_{Hi}$ formed by the vehicle lighting unit on a virtual vertical screen assumed to be disposed in front of the vehicle lighting unit (assumed to be disposed approximately 25 m ahead of the vehicle front), respectively.
Figure 4B:
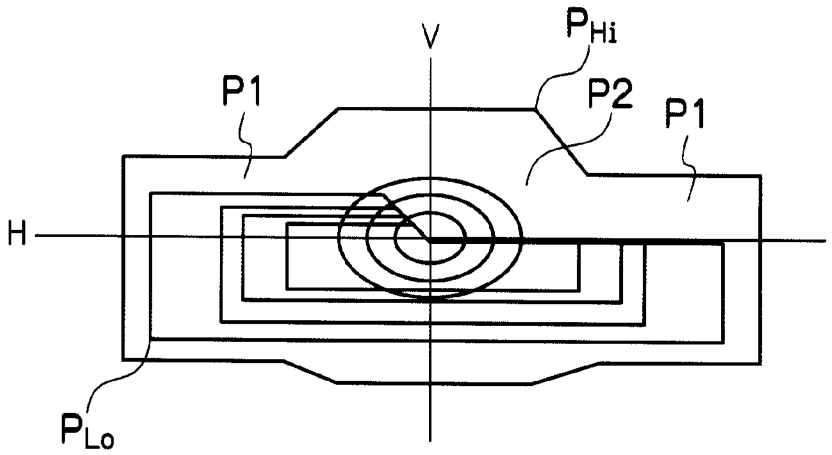

As illustrated in FIGS. 1 to 3, the vehicle lighting unit 10 can be a reflection type single lighting unit (also called as an optical module), and can include an LED device 12, a holder 14, a reflector 16, a heat sink 18, and the like.

Figure 5:
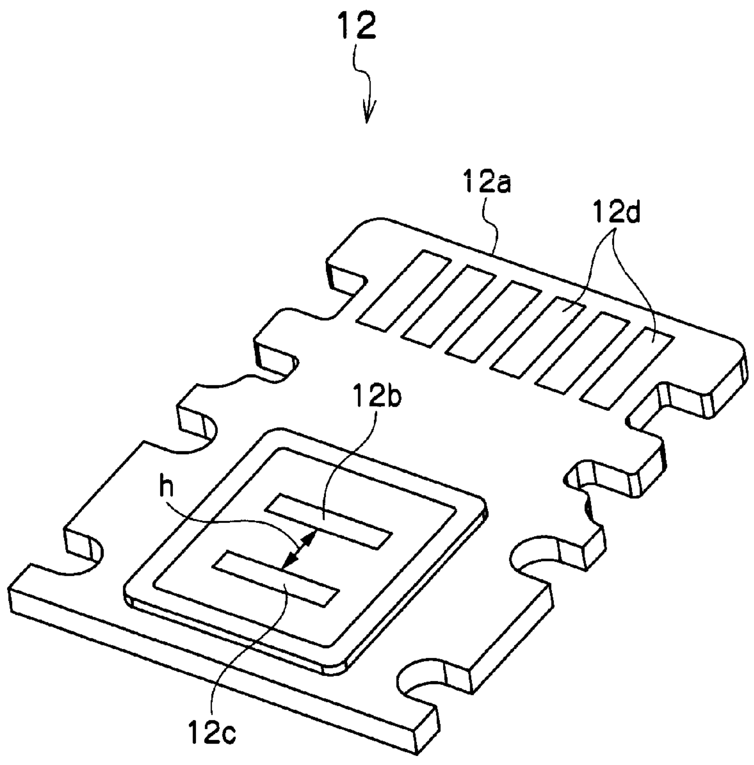
FIG. 5 is a perspective view of an LED device.

FIG. 5 is a perspective view of the LED device 12.

As illustrated in FIG. 5, the LED device 12 (corresponding to the light source of the presently disclosed subject matter) can include a metal substrate 12*a*, a first light-emitting section 12*b* and a second light-emitting section 12*c* (emission surfaces), and a plurality of terminals 12*d*. The first and second light-emitting sections 12*b* and 12*c* can have an elongated shape and be arranged in two rows on the surface of the substrate 12*b*.

The elongated light-emitting sections 12*b* and 12*c* each can be configured by mounting a semiconductor light-emitting element (for example, four light-emitting diodes each having a 1 mm-side square) using LEDs emitting blue light and a yellow phosphor (for example, YAG phosphor) on the surface of the substrate 12*a* at predetermined intervals in each row. The terminals 12*d* can be electrically connected to the respective light-emitting sections 12*b* and 12*c* (semiconductor light-emitting elements). The interval h between the first and second light-emitting sections 12*b* and 12*c* can be approximately 3 mm, for example.

It should be noted that the semiconductor light-emitting element is not limited to the above, but may be configured to include LEDs emitting red, blue, and green light beams, respectively or any other combinations depending on the intended purpose. The number of employed semiconductor light-emitting elements constituting the light-emitting sections 12*b* and 12*c* may be 1 or more.

As illustrated in FIG. 3, the heat sink 18 can include an attachment section 18*a*, and the LED device 12 can be fixed to the attachment section 18*a* while held (for example, interposed) between the holder 14 and the attachment section 18*a* such that the light-emitting sections 12*b* and 12*c* are directed downward in the vertical direction. The first and second light-emitting sections 12*b* and 12*c* can be arranged on the rear side and the front side in the front-to-rear direction of the vehicle body.

The heat sink 18 can be formed by aluminum die casting, and as illustrated in FIGS. 1 and 2, and can include the attachment section 18*a* to which the LED device 12 is attached, and a plurality of heat dissipation fins 18*b* configured to dissipate heat generated by the LED device 12. The heat sink 18 can be disposed on the rear side of the reflector 16. The plurality of heat dissipation fins 18*b* can be disposed on the rear surface of the heat sink 18 at predetermined intervals in the horizontal direction. The heat sink 18 can be used both for low-beam and high-beam illumination.

Figure 6A:
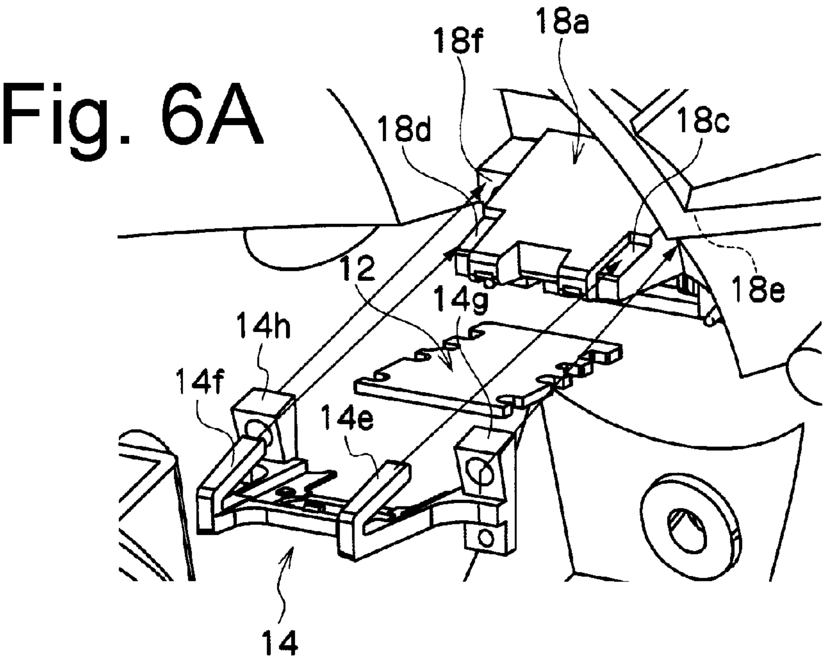
FIGS. 6A and 6B are an enlarged perspective view of the attachment section of a heat sink and its periphery when viewed from above and an enlarged view thereof when viewed from below.
Figure 6B:
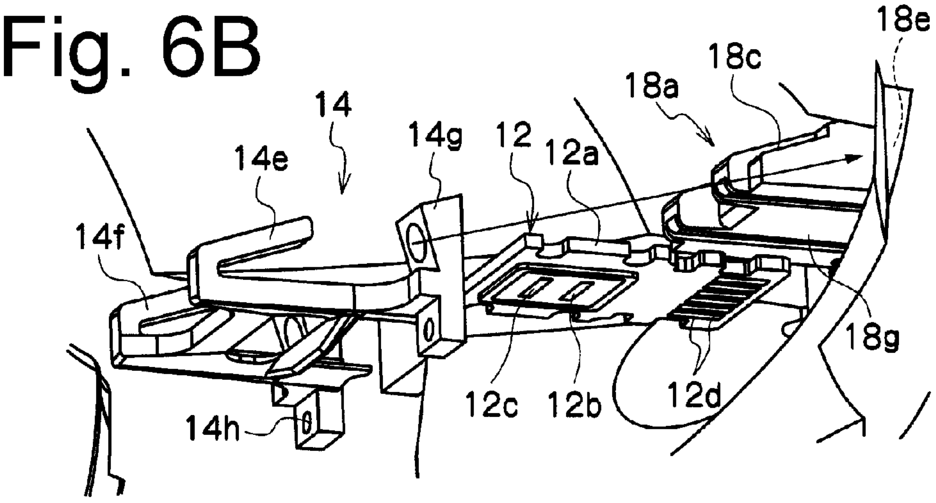

FIGS. 6A and 6B are an enlarged perspective view of the attachment section 18*a* of the heat sink 18 and its periphery when viewed from above and an enlarged view thereof when viewed from below.

As illustrated in FIGS. 6A and 6B, the attachment section 18*a* and the heat sink 18 can be a section projected forward from the front surface of the heat sink 18. The attachment section 18*a* can include grooves 18*c* and 18*d* to be engaged with hook portions 14*e* and 14*f* of the holder 14, and a placement surface 18*g* on which the LED device 12 is mounted.

Figure 7A:
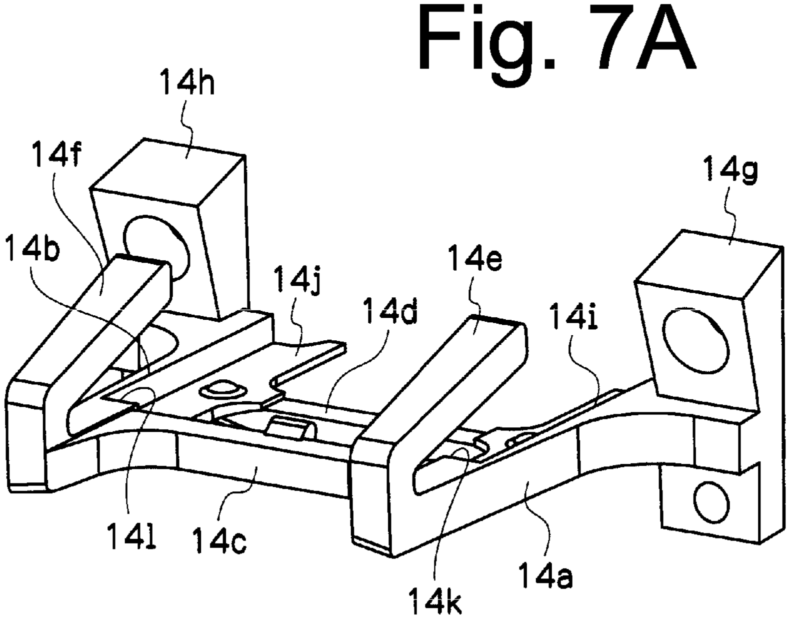
FIGS. 7A and 7B are perspective views of a holder when viewed from above and below, respectively.
Figure 7B:
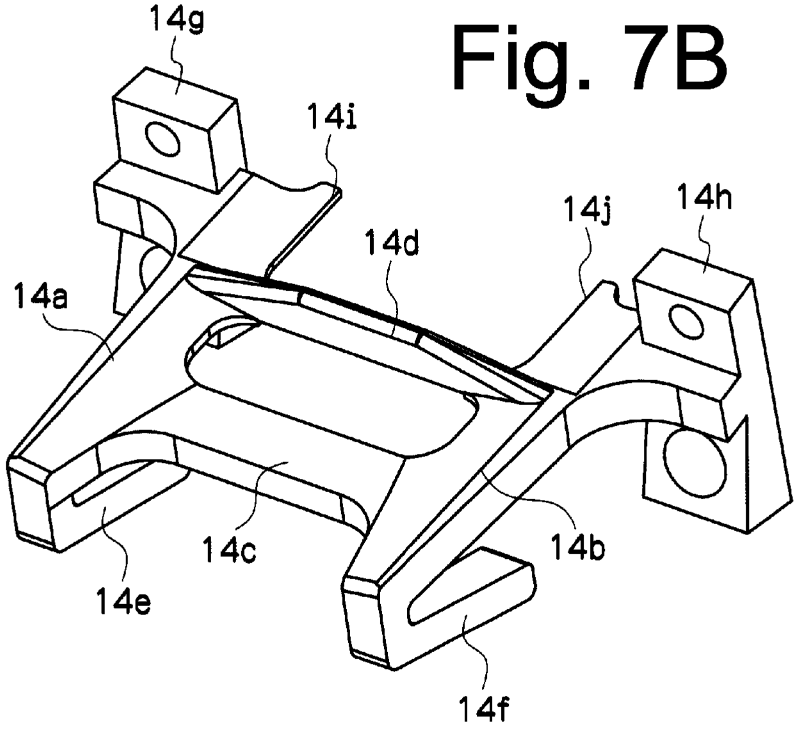

FIGS. 7A and 7B are perspective views of the holder 14 when viewed from above and below, respectively.

The holder 14 can be made of a high heat resistant resin, and as illustrated in FIGS. 7A and 7B, can include a pair of substrate supporting portions 14*a* and 14*b*, a connection portion 14*c*, a light-shielding portion 14*d*, etc. The reason why the holder 14 is not made of metal but made of a high heat resistant resin is to decrease the weight thereof and increase the accuracy. The reason also includes that the holder 14 must be arranged in the proximity of the light-emitting sections 12*b* and 12*c*.

The pair of substrate supporting portions 14*a* and 14*b* can be disposed in parallel with each other at a predetermined interval, and can be connected with each other by the connection portion 14*c* at their tip ends. The pair of substrate supporting portions 14*a* and 14*b* can further be connected with each other by the light-shielding portion 14*d* at positions closer to the base ends of the substrate supporting portions 14*a* and 14*b* than the connection portion 14*c*.

The hook portions 14*e* and 14*f* can be formed at the ends of the respective substrate supporting portions 14*a* and 14*b* so as to be engaged with the grooves 18*c* and 18*d* of the attachment section 18*a* of the heat sink 18. At the base end portions of the respective substrate supporting portions 14*a* and 14*b*, fixing portions 14*g* and 14*h* can be formed to be fixed to portions 18*e* and 18*f* of both sides of the attachment section 18*a* of the heat sink 18.

The respective substrate supporting portions 14*a* and 14*b* can include supporting pieces 14*i* and 14*j* configured to support the LED device 12, and contact surfaces 14*k* and 14*l* with which the tip end of the substrate 12*a* of the LED device 12 can be in contact.

With this configuration, the LED device 12 can be fixed to the attachment section 18*a* of the heat sink 18 in the following manner.

Figure 8:
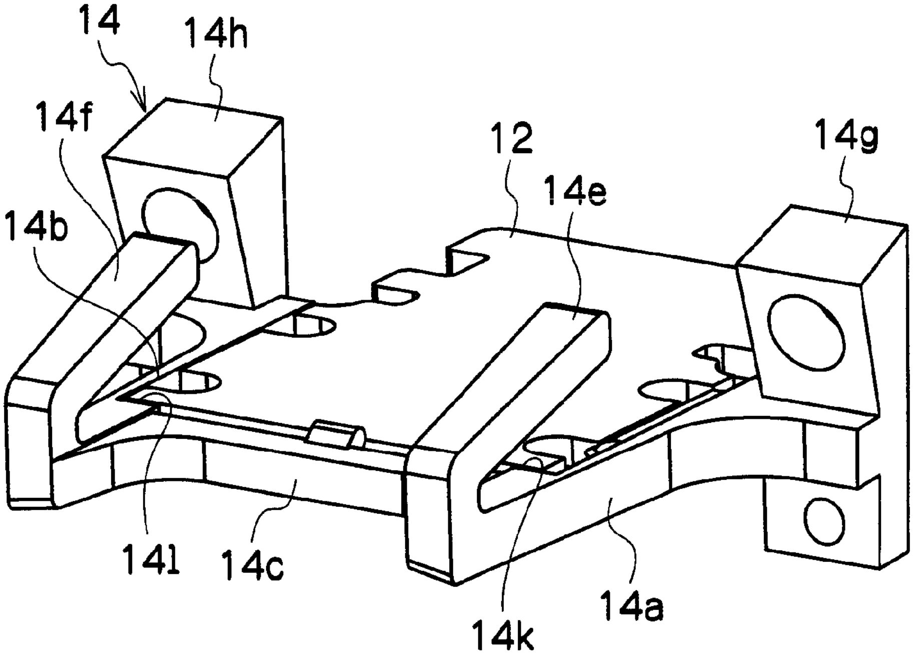
FIG. 8 is a diagram illustrating how to fix an LED device to the attachment section of the heat sink.
Figure 9:
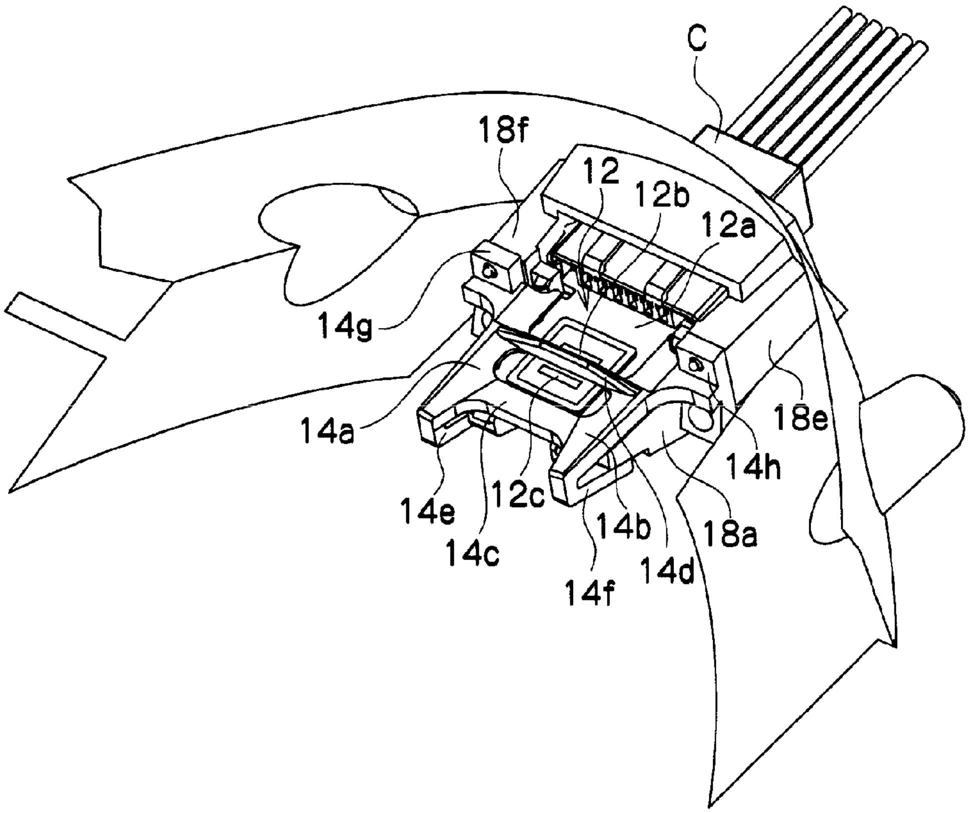
FIG. 9 is a perspective view of the LED device fixed to the attachment section of the heat sink when viewed from below.

FIG. 8 is a diagram illustrating how to fix the LED device 12 to the attachment section 18*a* of the heat sink 18. FIG. 9 is a perspective view of the LED device 12 fixed to the attachment section 18*a* of the heat sink 18 when viewed from below.

First, as illustrated in FIG. 8, the LED device 12 is maintained such that the light-emitting sections 12*b* and 12*c* are directed downward in the vertical direction, and then mounted on the supporting pieces 14*i* and 14*j* between the pair of substrate supporting portions 14*a* and 14*b* of the holder 14. Next, as illustrated in FIGS. 6A and 6B, the holder is moved to engage the hook portions 14*e* and 14*f* of the holder 14 with the grooves 18*c* and 18*d* of the attachment section 18*a* of the heat sink 18, and the fixing portions 14*g* and 14*h* of the holder 14 are screwed to the portions 18*e* and 18*f* on both sides of the attachment section 18*a* of the heat sink 18. (See FIG. 9.) This can appropriately dispose the light-shielding section 14*d* between the first light-emitting section 12*b* and the second light-emitting section 12*c*.

The light-shielding section 14*d* can shield part of light from the first light-emitting section 12*b* to prevent the light from being incident on the sub-reflection surface 16*c* and be disposed between the first and second light-emitting sections 12*b* and 12*c*. The light-shielding section 14*d* can extend forward and obliquely downward (see FIG. 3) so as to prevent the light from the first light-emitting section 12*b* from being incident on the sub-reflection surface 16*c* and to cause the light from the first light-emitting section 12*b* to be incident on the lower reflection surface 16*a* as much as possible. The shape of the light-shielding section 14*d* is not particularly limited as long as the light-shielding section 14*d* can shield part of light from the first light-emitting section 12*b* so as to prevent the light from the first light-emitting section 12*b* from being incident on the sub-reflection surface 16*c*. The downward direction and angle in and at which the light-shielding section 14*d* extends are not specifically limited to particular value.

In this manner, while the light-emitting sections 12*b* and 12*c* are directed downward in the vertical direction and the LED device 12 is held (for example, interposed) between the holder 14 (the supporting pieces 14*i* and 14*j*) and the attachment section 18*a* (the placement surface 18*g*) of the heat sink 18, the LED device 12 can be fixed to the attachment section 18*a* of the heat sink 18. In this configuration, the end of the substrate 12*a* of the LED device 12 can be in contact with the contact surfaces 14*k* and 14*l* of the holder 14, as illustrated in FIG. 8. Furthermore, the base end of the substrate 12*a* of the LED device 12 can be in contact with the front surface of the heat sink 18, as illustrated in FIG. 9. Furthermore, the rear surface of the LED device 12 (substrate 12*a*) can be in contact with the attachment 18*c* of the heat sink 18 (the placement surface 18*g*).

As illustrated in FIG. 3, the reflector 16 can include the lower reflection surface 16*a* disposed below the LED device 12, the upper light reflection surface 16*b* disposed above the LED device 12, the sub-reflection surface 16*c* disposed in front of the LED device.

The respective reflection surfaces 16*a*, 16*b*, and 16*c* can be configured as a single component by integrally molding a resin using a metal mold to form a reflector base material and subjecting the reflector base material to a mirror finishing treatment such as aluminum vapor deposition. This configuration can reduce the number of components, simplify the assembly step of the respective reflection surfaces 16*a*, 16*b*, and 16*c*, reduce the assembly errors of the respective reflection surfaces 16*a*, 16*b*, and 16*c*, when compared with the case where the respective reflection surfaces 16*a*, 16*b*, and 16*c* are configured as separately prepared individual components. However, the presently disclosed subject matter is not limited thereto, and they may be prepared as separate individual parts to be integrally assembled.

The lower reflection surface 16*a* can be configured to reflect light from the first light-emitting section 12*b* to forwardly project light beams substantially parallel with each other in the vertical direction and diffused in the horizontal direction, thereby forming at least part of the low-beam light distribution pattern $P_{Lo}$. The lower reflection surface 16*a* can be composed of, for example, a paraboloid of revolution as a basic surface, having a focus $F_{16a}$ at or substantially near the first light-emitting section 12*b*. The lower reflection surface 16*a* can be disposed below the LED device 12 so as to receive light emitted downward from the first light-emitting section 12*b* and not shielded by the light-shielding section 14*d* of the holder 14. The lower reflection surface 16*a* can constitute the first optical system of the presently disclosed subject matter.

The sub-reflection surface 16*c* can be configured to reflect light from the second light-emitting section 12*c* upward. The sub-reflection surface 16*c* can be composed of, for example, an ellipsoid of revolution as a basic surface having a first focus F1 at or substantially near the second light-emitting section 12*c* and a second focus F2 at a position between the sub-reflection surface 16*c* and the upper reflection surface 16*b*. The sub-reflection surface 16*c* can be disposed forward of the LED device 12 and at a position where the light emitted from the first light-emitting section 12*b* and incident on the lower reflection surface 16*a* is not shielded.

The upper reflection surface 16*b* can be configured to reflect light emitted from the second light-emitting section 12*c* and reflected by the sub-reflection surface 16*c* to forwardly project light beams, thereby forming the condensation area in the high-beam light distribution pattern $P_{Hi}$ (see FIG.

4B). The upper reflection surface 16*b* can be composed of, for example, a paraboloid of revolution as a basic surface having a focus $F_{16b}$ at or substantially near the second focus F2 of the sub-reflection surface 16*c*. The upper reflection surface 16*b* can be disposed above the LED device 12 so as to receive the reflected light from the sub-reflection surface 16*c*. The sub-reflection surface 16*c* and the upper reflection surface 16*b* can constitute the second optical system of the presently disclosed subject matter.

It should be noted the sub-reflection surface 16*c* can be composed of a planar mirror and the upper reflection surface 16*b* can be composed of a paraboloid of revolution having a focus $F_{16b}$ positioned at or near the second light-emitting section 12*c* with the aid of the planar mirror sub-reflection surface 16*c*.

A description will now be given of an operation example of the first and second light-emitting sections 12*b* and 12*c*, specifically, an operation example of switching between a low-beam light distribution pattern $P_{Lo}$ and a high-beam light distribution pattern $P_{Hi}$.

Figure 10:
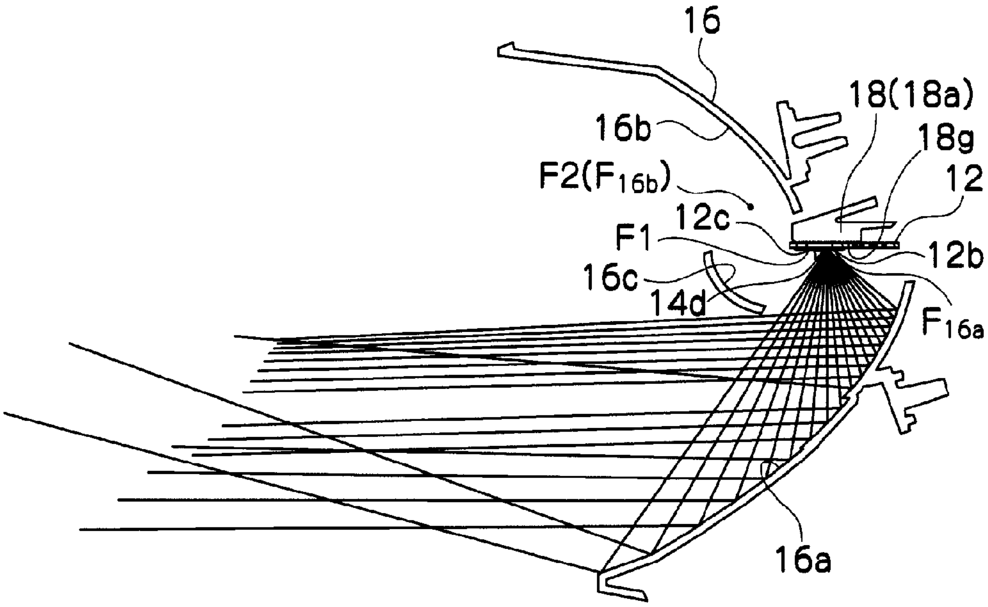
FIG. 10 is a diagram illustrating optical paths when a low-beam light distribution is to be formed.
Figure 11:
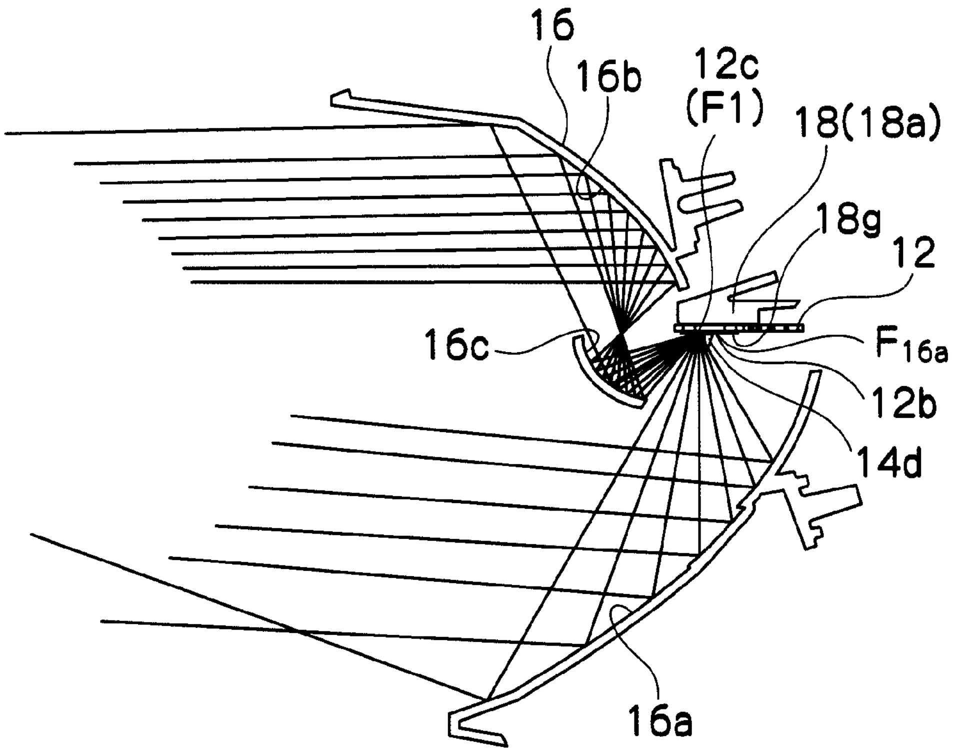
FIG. 11 is a diagram illustrating optical paths when a high-beam light distribution is to be formed.

FIG. 10 is a diagram illustrating optical paths when a low-beam light distribution $P_{Lo}$ is to be formed, and FIG. 11 is a diagram illustrating optical paths when a high-beam light distribution $P_{Hi}$ is to be formed. The switching between a low-beam light distribution pattern $P_{Lo}$ and a high-beam light distribution pattern $P_{Hi}$ can be achieved by a controller circuit (control unit 20 shown in FIG. 3) such as an ECU electrically connected to the first and second light-emitting section 12*b* and 12*c* (the semiconductor light-emitting devices) via the terminals 12*d*.

The controller circuit (control unit 20) can individually control the turning-on state (turning ON or OFF) of the first light-emitting section 12*b* and the second light-emitting section 12*c*, for example, by means of IF reduction or pulse control, thereby switching between a low-beam light distribution pattern $P_{Lo}$ and a high-beam light distribution pattern $P_{Hi}$.

For example, when a low-beam light distribution pattern $P_{Lo}$ is to be formed, the controller circuit can control the respective first and second light-emitting sections 12*b* and 12*c* so as to turn on the first light-emitting section 12*b* and turn off the second light-emitting section 12*c*. The light emitted from the first light-emitting section 12*b* can be reflected, as illustrated in FIG. 10, by the lower reflection surface 16*a* and projected forward so as to form the low-beam light distribution pattern $P_{Lo}$ on a virtual vertical screen (see FIG. 4A). In this configuration, the light from the first light-emitting section 12 can be shielded by the light-shielding section 14*d* of the holder 14, so that the light cannot be incident on the sub-reflection surface 16*c*. When the LED device 12 including the first and second light-emitting sections 12*b* and 12*c* arranged on the surface of the substrate 12*a* in two rows is used as a light source, the light from the first light-emitting section 12*b* may enter the second optical system (may be incident on the sub-reflection surface 16*c*), thereby causing glare light or so. To cope with this, the vehicle lighting unit 10 for use in a vehicle headlight according to the present exemplary embodiment can include the light-shielding section 14*d* arranged between the first and second light-emitting sections 12*b* and 12*c*, thereby effectively shield part of light from the first light-emitting section 12*b* not to enter the second optical system (not to be incident on the sub-reflection surface 16*c*). Accordingly, any glare light or the like can be prevented from being generated.

When a high-beam light distribution pattern $P_{Hi}$ is to be formed, the controller circuit can control the respective first and second light-emitting sections 12*b* and 12*c* so as to turn on the first light-emitting section 12*b* and the second light-emitting section 12*c*. In this case, the light emitted from the first light-emitting section 12*b* can be reflected, as illustrated in FIG. 10, by the lower reflection surface 16*a* and projected forward so as to form the low-beam light distribution pattern $P_{Lo}$ on a virtual vertical screen.

The light emitted from the second light-emitting section 12*c* and directed downward can be reflected, as illustrated in FIG. 11, and projected forward so as to form the high-beam light distribution pattern $P_{Hi}$ on a virtual vertical screen. At this time, since the position of the second light-emitting section 12*c* may be shifted a little forward from the focus $F_{16a}$ of the lower reflection surface 16*a*, the high-beam light distribution pattern $P_{Hi}$ can have a diffusion area P1 with a blur pattern more than the low-beam light distribution $P_{Lo}$ is. The light emitted from the second light-emitting section 12*c* and directed forward can be reflected by the sub-reflection surface 16*c* and then the upper reflection surface 16*b*, and projected forward so as to form the condensation area P2 in the high-beam light distribution pattern $P_{Hi}$.

As a result, the high-beam light distribution pattern $P_{Hi}$ can be composed of the patterns $P_{Lo}$, P1, and P2 overlaid with each other.

As discussed above, in the vehicle lighting unit 10 for use in a vehicle headlight according to the present exemplary embodiment, since the single vehicle lighting unit 10 configured to form a low-beam light distribution pattern and a high-beam light distribution pattern can reduce costs and assembly steps for light sources. This is because two separate lighting sections are not used as light sources, but the single LED device 12 can include the first light-emitting section 12*b* and the second light-emitting section 12*c* arranged in two rows on the surface of the substrate 12*a*.

When a light source including the first light-emitting section 12*b* and the second light-emitting section 12*c* arranged in two rows on the surface of the substrate 12*a* is used for the vehicle lighting unit 10, glare light may be generated due to the light from the first light-emitting section 12*b* entering the second optical system (the sub-reflection surface 16*c*).

To cope with this, the vehicle lighting unit 10 according to the present exemplary embodiment can include the light-shielding section 14*d* disposed between the first light-emitting section 14*b* and the second light-emitting section 14*c*, and the light-shielding section 14*d* can shield the light from the first light-emitting section 14*b* so as not to enter the second optical system (sub-reflection surface 16*c*), thereby preventing glare light and the like from being generated.

Furthermore, since the single vehicle lighting unit 10 can form the low-beam light distribution pattern and the high-beam light distribution pattern. Accordingly, when compared with the conventional vehicle lighting unit, a space where the vehicle lighting unit is to be installed can be reduced. This can facilitate the achievement of a smaller vehicle lighting unit for use in a vehicle headlight.

Furthermore, in the vehicle lighting unit 10 according to the present exemplary embodiment, only by allowing the LED device 12 to be held between the holder 14 and the attachment section 18*a* of the heat sink 18, the light-shielding section 14*d* can be appropriately disposed between the first light-emitting section 12*b* and the second light-emitting section 12*c*.

Since the single vehicle lighting unit 10 for use in a vehicle headlight according to the present exemplary embodiment can be configured to form a low-beam light distribution pattern and a high-beam light distribution pattern, this can reduce the number of components. As a result, the parts cost, processing cost, assembly cost, and the like can be reduced, resulting in cost reduction per one lighting unit (optical module unit) as well as reduction in weight and size.

Further, according to the vehicle lighting unit 10 for use in a vehicle headlight of the present exemplary embodiment, a vehicle lighting unit with a novel appearance while enabling the formation of a low-beam light distribution pattern and a high-beam light distribution pattern with a single lighting unit can be achieved.

A description will now be given of modifications made in accordance with the principles of the presently disclosed subject matter.

In contrast to the above-described embodiment, the vehicle lighting unit can include a first optical system (including a lower reflection surface 16*a*) configured to form a high-beam light distribution pattern and a second optical system (including a sub reflection surface 16*c* and an upper reflection surface 16*b*) configured to form a low-beam light distribution pattern, and the respective reflection surfaces 16*a*, 16*b*, and 16*c* can have respective shapes appropriate for the formation of the respective light distribution pattern.

The vehicle lighting unit 10 illustrated in FIGS. 1 to 3 can be installed upside down. Also in this case, the similar advantageous effects can be achieved.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit configured to form a low-beam light distribution pattern and a high-beam light distribution pattern, the vehicle lighting unit comprising:

a light source having a substrate with a principal surface, and a first light-emitting section and a second light-emitting section arranged in two rows on the principal surface of the substrate, each of the first and second light-emitting sections including at least one semiconductor light-emitting element;

a first optical system configured to control light emitted from the first light-emitting section to form at least part of the low-beam light distribution pattern;

a second optical system configured to control light emitted from the second light-emitting section to form at least part of the high-beam light distribution pattern;

a light-shielding section disposed between the first light-emitting section and the second light-emitting section, the light-shielding section configured to shield part of the light from the first light-emitting section so as not to enter the second optical system; and a control unit configured to control the first light-emitting section and the second light-emitting section to switch the vehicle lighting unit to form the low-beam light distribution pattern or the high-beam light distribution pattern, wherein:

the first light-emitting section and the second light-emitting section are directed substantially downward in the vertical direction;

the first light-emitting section is disposed on a rear side in a front-to-rear direction of a vehicle body and the second light-emitting section is disposed on a front side in the front-to-rear direction of a vehicle body;

the first optical system includes a lower reflection surface disposed below the light source so as to allow light emitted from the first light-emitting section downward and not shielded by the light-shielding section to be incident thereon, the lower reflection surface being configured to reflect the light from the first light-emitting section to project the light forward so as to form part of the low-beam light distribution pattern;

the second optical system includes: a sub-reflection surface that is disposed in front of the light source and at a position where the light that is emitted by the first light-emitting section and to be incident on the lower reflection surface is not shielded and is configured to reflect light from the second light-emitting section upward; and an upper reflection surface disposed above the light source so as to allow the light reflected by the sub-reflection surface to be incident thereon; and the upper reflection surface is configured to reflect the light from the sub-reflection surface to project the light forward so as to form a condensation area of the high-beam light distribution pattern.

2. The vehicle lighting unit according to claim 1, further comprising an attachment section to which the light source is attached, and a holder configured to hold the light source between the attachment section and itself and to which the light-shielding section is provided.

* * * * *